United States Patent
Chatterjee

(12) 
(10) Patent No.: US 6,992,983 B1
(45) Date of Patent: Jan. 31, 2006

(54) BANDWIDTH DETECTION IN A HETEROGENEOUS NETWORK WITH PARALLEL AND PROXY MODES

(75) Inventor: Saurav Chatterjee, Foster City, CA (US)

(73) Assignee: Macromedia, Inc., San Francisco, CA (US)

( * ) Notice: Subject to any disclaimer, the term of this patent is extended or adjusted under 35 U.S.C. 154(b) by 0 days.

(21) Appl. No.: 09/566,186

(22) Filed: May 5, 2000

(51) Int. Cl.
  *H04J 1/16* (2006.01)
  *H04J 3/14* (2006.01)
(52) U.S. Cl. ............. 370/232; 370/252; 370/358; 370/400; 370/468; 370/477
(58) Field of Classification Search ......... 370/230, 370/232, 234, 252, 358, 468, 477, 400
  See application file for complete search history.

(56) References Cited

U.S. PATENT DOCUMENTS

| | | | |
|---|---|---|---|
| 6,006,264 A | 12/1999 | Colby et al. | 524/407 |
| 6,046,980 A | 4/2000 | Packer | 370/230 |
| 6,247,058 B1 * | 6/2001 | Miller et al. | 709/234 |
| 6,292,465 B1 | 9/2001 | Vaid et al. | 370/230 |

OTHER PUBLICATIONS

"Bing 1.0.4," Article can be found at http://spengler.econ.duke.edu/~ferizs/bing.txt.
Van Jacobson, "Pathchar," Article can be found at http://www.caida.org/tools/utilities/others/pathchar/.
Van Jacobson, "pathchar—a tool to infer characteristics of Internet paths," MSRI, Apr. 21, 1997, pp. 1-21, Berkeley, CA, Article can be found at: ftp://ftp.ee.lbl.gov/pathchar/.

* cited by examiner

*Primary Examiner*—Dang Ton
*Assistant Examiner*—Inder Pal Mehra
(74) *Attorney, Agent, or Firm*—Mark A. Haynes; Haynes Beffel & Wolfeld LLP

(57) ABSTRACT

Effective bandwidth of a communication link is determined in a heterogeneous, packet switched network between a source and a destination, where effective bandwidth is defined as the actual available bandwidth between the server and the client, minus the overhead of the various network protocols used to transmit the data. The method includes measuring transmission times between the source and a destination for a plurality data segments having different characteristics, such as different sized files or subfiles of data; processing the transmission times to cancel effects of transmission latencies other than the different characteristics of the data segments; and indicating a bandwidth based on said processing. The processing is done in parallel with the return of user resources to the destination, and using a bandwidth detection engine associated with a proxy server.

57 Claims, 6 Drawing Sheets

BANDWIDTH DETECTION IN A HETEROGENEOUS NETWORK WITH PARALLEL AND PROXY MODES

BACKGROUND OF THE INVENTION

1. Field of the Invention

The present invention relates generally to data communication networks, and to techniques for determining bandwidth of communication links between a source and a destination in such data communication networks. More particularly, the present invention relates to the detection of the bandwidth of links between an Internet server and a client computer.

2. Description of Related Art

Networks are utilized extensively to transmit data from one computer system to another. There are many types of networks which are heterogeneous, in that the network has many different types of devices and different types of communication media executing multiple layers of network protocols arranged in stacks for interconnecting the various devices using the diverse media. One example of such a network is the Internet. However, a continuing problem when transmitting data over such networks is the bandwidth of the network. The problem is particularly relevant in connection with the Internet and the World Wide Web, as the Internet becomes a vehicle for delivering a wide variety of resources between servers and clients.

As mentioned above, the Internet is highly heterogeneous. Some devices are connected to the Internet over a standard telephone network modem or a wireless network, with limited bandwidth. Other devices are connected over a high-speed links and have much higher bandwidth capabilities. Users who download graphically rich multimedia objects embedded within Web pages over a lower bandwidth link frequently must wait a significant amount of time for delivery of multimedia objects. This frustrates users of the Internet and results in less use.

For a variety of reasons, it is desirable to detect the bandwidth of a communication link between a server and a client in the Internet, and in other heterogeneous networks. However, the heterogeneity of the network prevents straight-forward solutions to this problem. Previous approaches to bandwidth detection in a heterogeneous network include pathchar and bing. (See, "Pathchar-Tool written by Van Jacobson of LBL's Network Research Group." http://www.caida.org/Pathchar; and "Bing 1.04" http://spengler.econ-.duke.edu/~ferizs/bing.txt.) These previous approaches have several deficiencies. In pathchar, the algorithm attempts to establish bandwidth detection on a link by link basis for a communication channel through the network. This process is impractical because it can take several hours to accurately compute the bandwidth of the channel. Both pathchar and bing are deficient because they do not function if there are firewalls between the server and the client, and return grossly inaccurate measurements if there are proxies between the server and the client.

Accordingly, it is desirable to detect the effective bandwidth between a server and a client quickly and efficiently. Furthermore, it is desirable to provide such detection in widely used heterogeneous networks, such as the Internet.

SUMMARY OF THE INVENTION

The present invention quickly detects the effective bandwidth between a server and a client, such as a Web server and a browser, operating in order of milliseconds or seconds. Further, it enables concurrent bandwidth detection of many clients. The invention works even if there are Web proxy servers, with and without caches, or other devices that terminate the transmission layer connection, between the server and a client. In addition, the technique works even if there are firewalls between the client and server.

The present invention provides various methods for determining effective bandwidth of a communication link in a heterogeneous, packet switched network between a source and a destination, where effective bandwidth is defined as the actual available bandwidth between the source, like a web server, and a destination, like a client browser, minus the overhead of the various network protocols and intervening systems used to transmit the data. One method includes detecting a request for a user resource, and in parallel with returning the user resource, measuring transmission times between the source and the destination for a plurality data segments having different characteristics, such as different sized files or subfiles of data; processing the transmission times to cancel effects of transmission latencies other than the different characteristics of the data segments; and indicating a bandwidth based on said processing.

According to one embodiment, the transmission times are measured by transmitting first and second data segments between the source and a destination, which have different sizes. Contacts are received from the destination indicating when the first data segment is received and the second data segment is received. A first time interval is determined between the transmitting of the first data segment and the receiving of the first contact, and a second time interval is determined between the transmitting of the second data segment and the receiving of the second contact. The first and second time intervals are processed, for example by computing a difference between the time intervals, and normalizing the difference in the time intervals based on the difference in the sizes of the first and second segments. Additional data points can be generated by transmitting additional data segments, which would allow for processing according to higher order techniques. This processing results in a value which tends to cancel the effects of transmission latencies other than the size of the data segments. A bandwidth between the server and a client is indicated based on such processing. In this example, the transmission times are computed from the source to the destination. In an alternative example, the transmission times are computed in the opposite direction.

According to one embodiment, the destination comprises an application executing a point-to-point communication protocol with the source over the packet switched network, such as a protocol compliant with a standard hypertext transfer protocol HTTP. In one embodiment, the destination comprises an Internet browser. In one embodiment, the source comprises a server for resources that are identified by universal resource indicators URIs or universal resource locators URLs.

According to another aspect of the invention, said measuring technique includes a redirection-based technique including detecting a request originating at the destination for resource at the source, appending a tag to the resource and returning it to the destination. The tag identifies a second resource and causes the destination to request the second resource. At a server storing the second resource, which may be the same as that storing the first resource, or different than that storing the first resource, the request for the second resource is detected. The second resource is returned with a tag identifying a third resource and causes the destination to request the third resource. At a server storing the third resource, again which may be the same or different than the server storing the first and second resources, the request for the third resource is detected. The third resource is returned and a first time interval between returning of the second resource and the detecting of the request for the third resource, or other contact from the destination indicating receipt of the second resource, is computed. At a server storing the third resource, a contact from the destination of the receipt of the third resource is received. A second time interval between returning the third resource to the destination, and the detecting of the contact from the destination of receipt of the third resource is determined. The difference between the first time interval and the second time interval is used to compute the apparent bandwidth. According to this aspect of the invention, a server is considered the same, if it is accessible using the same domain name according to the HTTP protocol, or by similar addressing indications used in other protocols.

Another aspect of the present invention includes performing the bandwidth measurement in an intermediate device in the network. In one method, the intermediate device comprises a proxy server (including a cache), and a bandwidth detection engine is associated with the proxy server for making bandwidth determinations.

Yet another aspect of the invention includes maintaining a database of bandwidth parameters indexed by Internet Protocol addresses or other network addresses, where the bandwidth parameters are supplied by third parties, generated using measurement techniques or a combination of techniques and third party information.

In summary, the present invention provides for the detection of bandwidth in heterogeneous networks between the server and a client which is quick, efficient, enables concurrent bandwidth detection of many clients, and works even if there are nodes in the network which terminate communication sessions at lower protocol layers of the network.

Other aspects and advantages of the present invention can be seen upon review of the figures, the detailed description, and the claims which follow.

DETAILED DESCRIPTION

Figure 1:
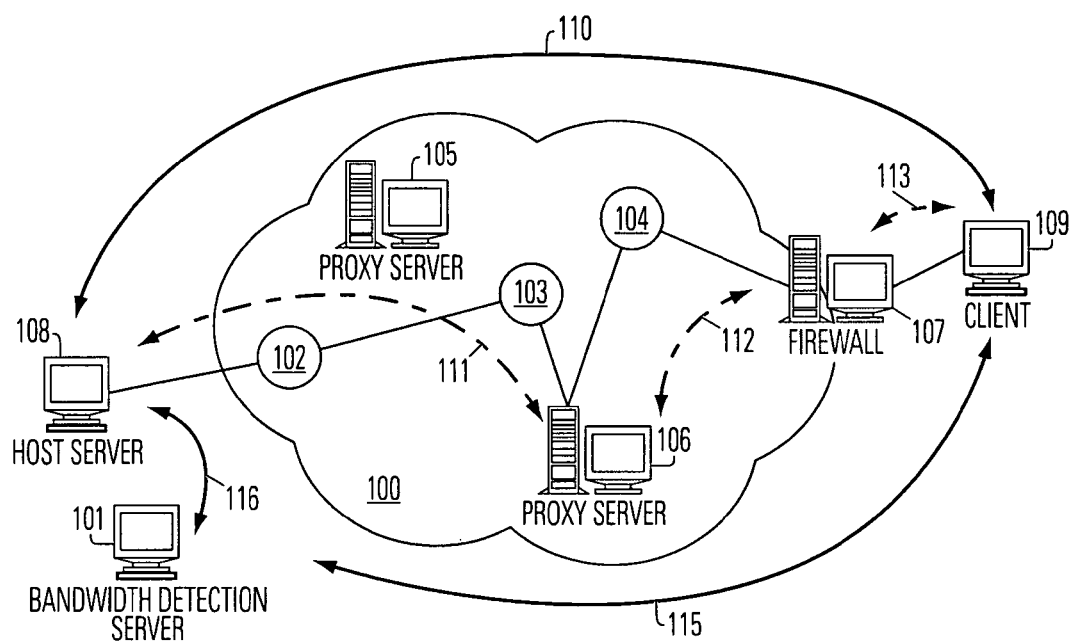
FIG. 1 is a simplified block diagram of a heterogeneous network including a bandwidth detection server according to one preferred embodiment of the present invention.

FIG. 1 illustrates a heterogeneous network 100 including a bandwidth detection server 101 according to the present invention. The network 100 in this example is the Internet and includes a plurality of switching and routing nodes indicated in FIG. 1 by circles 102, 103, 104. In support of the delivery of Web pages and multimedia content across the Internet, proxy servers 105 and 106 are illustrated in this example. In addition, a firewall 107 resides on the edge of the network 100. According to the present invention, a host server 108 is accessed by a client 109. A point-to-point communication link 110 is set up using a protocol such as the hypertext throughput protocol HTTP. Transmission layer links between a client and a host server may comprise multiple hops operating in a protocol such as the Transmission Control Protocol TCP, including a point-to-point session 111 between the host server 108 and the proxy server 106, point-to-point session 112 between the proxy server 106 and the firewall 107, and point-to-point session 113 between the firewall 107 and the client 109. In some examples, multiple threads through the Internet 100 can be established between the host server and a client to serve the point-to-point channel 110 which is established with a protocol operating above the transmission layer. In order to detect the effective bandwidth to the client 109, the effects of the heterogeneous nature of the Internet are canceled according to the present invention. In a preferred embodiment, these effects are canceled by an exchange of data segments on communication channel 115 between the bandwidth detection server 101 and client 109. The bandwidth detection server 101 communicates with the host server 108 via channel 116, or in an alternative configuration with a proxy server delivering the content of the host server 108, for use in managing the transmission of data to the client 109. In various embodiments, the bandwidth detection server 101 and the host server 108 reside in a single site on the Internet, in that they have a common domain name. Alternatively, the bandwidth detection server 101 may reside at the site of a proxy server serving the communication channel 110 between the host server 108 and client 109. In yet other embodiments, the bandwidth detection server 101 resides at a unique site on Internet.

An algorithm for detecting the bandwidth to the client 109 is executed in cooperation with the bandwidth detection server 101. The algorithm may be initiated by the host server using a redirect technique signaling the client 109 to establish the link 115 with the bandwidth detection server 101. Alternatively, the algorithm maybe initiated by an executable program running on the client 109, such as an applet or plug-in for an Internet browser on the client 109. In yet another alternative, bandwidth detection is executed by an algorithm which inserts bandwidth detection server 101 between the client 109 and the host server 108, so that a portion of the traffic in channel 110 is directed through the bandwidth detection server, at which throughput of such traffic can be detected. More details concerning various alternatives for bandwidth detection are described below with reference to FIGS. 2 through 6.

Figure 2:
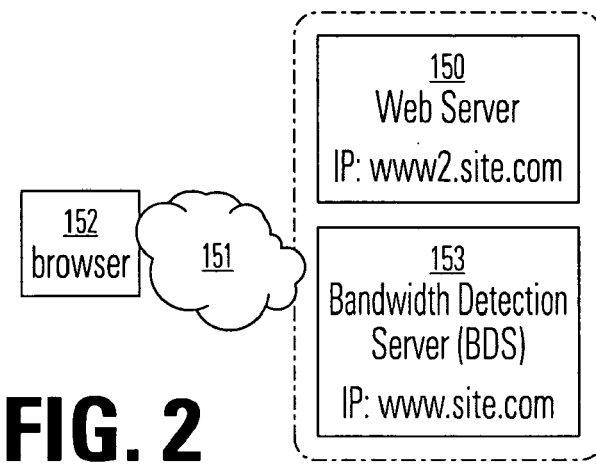
FIG. 2 is a simplified diagram of a network implementing a redirection technique for bandwidth detection.

FIGS. 2 through 7 illustrate various embodiments for bandwidth detection according to the present invention based on redirection. FIG. 2 illustrates a simplified architecture including the originating web server 150 and a destination browser 152 coupled to the Internet 151, or other packet switched communication network. A bandwidth detection server 153 is associated with the web server 150.

The originating web server 150 communicates via the Internet 151 with the browser 152.

Figure 3:
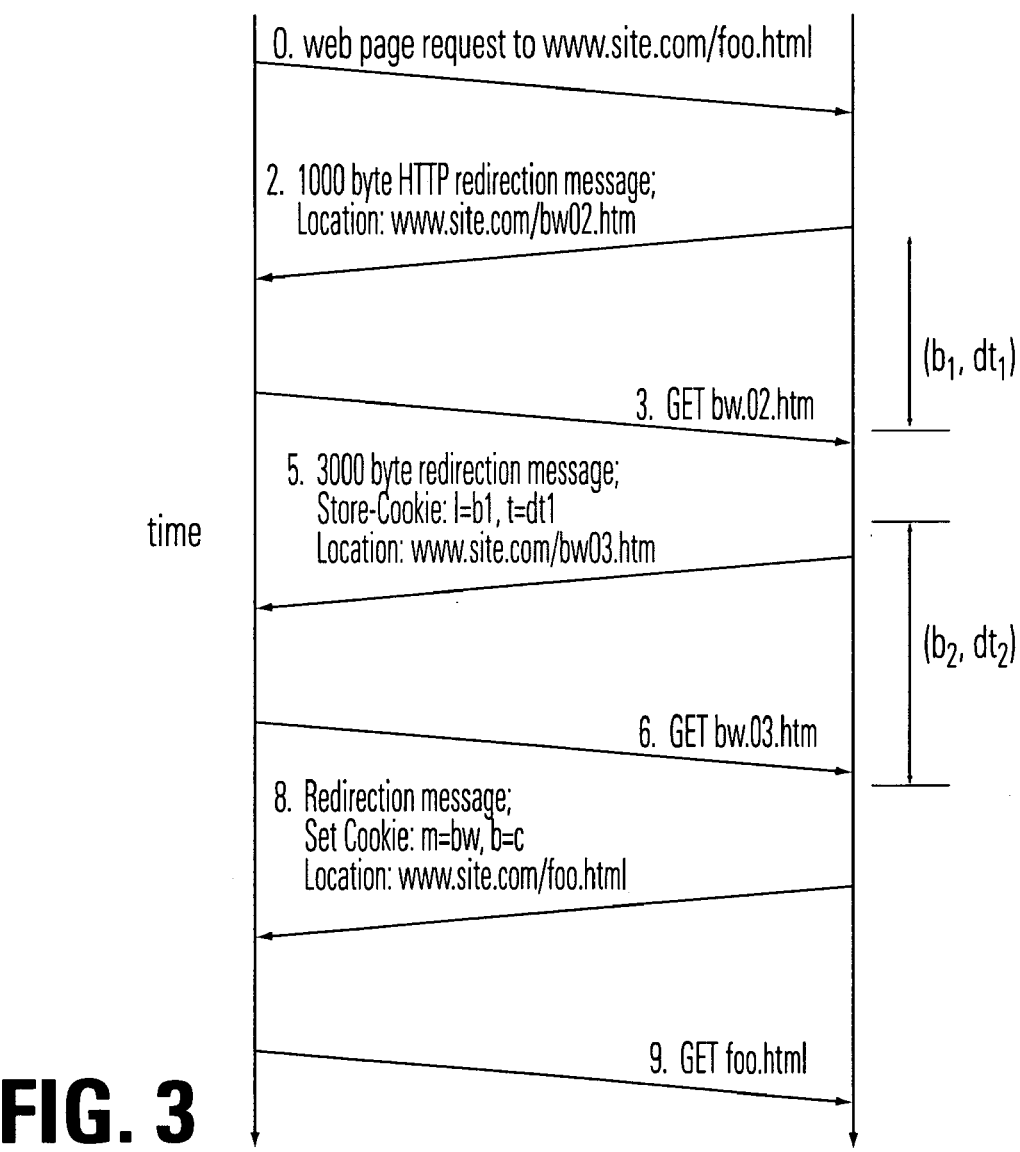
FIG. 3 illustrates communications between a client browser and the servers of the system in FIG. 2, for one embodiment.

FIG. 3 is a simplified diagram showing a communication time line among the destination browser 152, the web server 150, and the bandwidth detection server 153 in support of the bandwidth detection algorithm using redirection. In this example, the bandwidth detection server 153 resides at the location first accessed. The destination request is redirected to a second site for the actual web page, after bandwidth detection.

The communication steps in FIG. 3 are numbered 3-0 through 3-10.

- 3-0. The destination browser requests a Web page from address "www.site.com/foo.html" at which the bandwidth detection server resides.
- 3-1. At machine "www.site.com," store redirection header size, start timer.
- 3-2. At machine "www.site.com," send a 1000 byte HTTP redirection message to the browser, redirecting browser to location "www.site.com/bw02.htm;"
- 3-3. Browser sends a message "GET bw02.htm" to the redirect site;
- 3-4. When the GET message is recieved, site "www.site.com" stops the timer; calculates dt1; stores next redirection header size, and starts the timer again;
- 3-5. At machine "www.site.com," send a 3000 byte redirection message with a cookie: l=b1, t=dt1, which redirects the browser to location: www.site.com/bw03.htm;
- 3-6. Browser sends a message "GET bw03.htm" to the redirect site;
- 3-7. When the GET message is recieved, site "www.site.com" stops the timer; calculates dt2; gets cookie l and t, uses it to calculate bandwidth bw, where $$bw=(b2-l)/(dt2-t),$$

$$c=t-(1/bw)*l$$

- 3-8. At machine "www.site.com," send a redirection message, set cookie m=bw, b=c, and redirect the browser to location: www2.site.com/foo.html;
- 3-9. Browser sends message "GET foo.html;" 3-10. At machine www2.site.com; a web server, such as an Apache web server, passes cookie m, b and URL request to adaptation module, in which a plug-in adapts the requested page, foo.html, based on bandwidth cookies.

Figure 4:
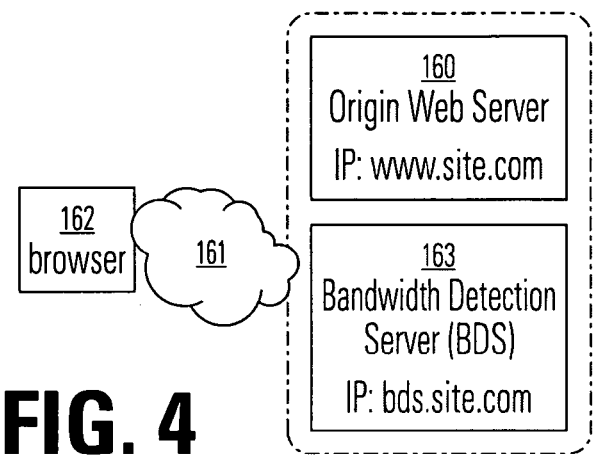
FIG. 4 is a simplified diagram of a network implementing a redirection technique for bandwidth detection, using a parallel mode.

FIG. 4 illustrates a simplified architecture including the originating web server 160 and a destination browser 162 coupled to the Internet 161, or other packet switched communication network. A bandwidth detection server 163 is associated with the web server 160. The originating web server 160 communicates via the Internet 161 with the browser 162.

Figure 5:
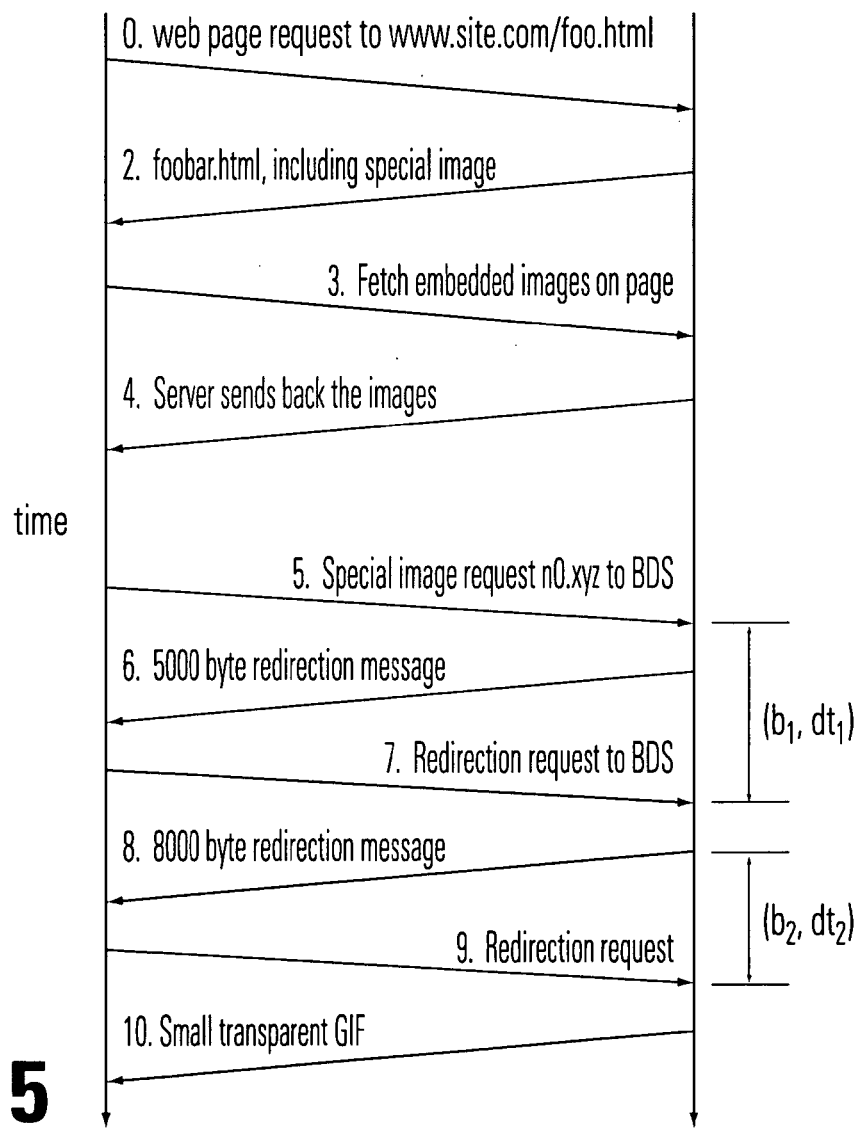
FIG. 5 illustrates communications between a client browser and the servers of the system in FIG. 4, for one embodiment.

FIG. 5 is a simplified diagram showing a communication time line among the destination browser 162, the web server 160, and the bandwidth detection server 163 in support of the bandwidth detection algorithm using redirection. In this example, the bandwidth detection server 163 resides at the location accessed in parallel with the web server 160. The first page is served in without waiting for bandwidth measurement, without adaptation based on real time bandwidth measurements. Subsequent pages may be adapted according to the measured bandwidth.

The redirection approach for the system of FIGS. 4 and 5 utilizes the redirection command within the HTTP protocol. When bandwidth measurements need to be made, the bandwidth detection server 152 attaches to a web page a "tag" comprising special image URL at the end of the file. This URL points to the bandwidth detection server.

The bandwidth detection software, when contacted by the client for the nth time, sends back a "302 Moved Temporarily" redirection HTTP return message to the client. The Location header specifies a new URL. Comments are ensconced between the redirection command and the Location header so as to vary the size of the return message, where the comment size is a function of n. At least two series of redirection messages are sent back to the client.

The server measures the time from when it transmits the redirection message back to the client until the time the client contacts it again based on the new URL specified in the Location header. Each time it stores the duration from the send of the redirection message to the re-contact from the client as well as the number of bytes transmitted in the header during each transmission. These data points are used to calculate bandwidth and latency, although this time latency includes the TCP connect time and the time for the browser to process the header. The end-to-end connections occur at the HTTP level instead of the TCP level, and firewalls and proxies do not pose a problem to this solution.

The steps in FIG. 5 are numbered 5-0 through 5-10:

- 5-0. The destination browser requests a Web page from address "www.site.com/foo.html."
- 5-1. At machine: www.site.com, create page foobar.html, where foobar.html is foo.html if no existing bw cookies, else foobar.html is an adapted form of foo.html based on existing bw cookie. The server embeds a tag in foobar.html in the form of a special image "<img src=http://bds.site.com/n0.xyz>", for example by adding it right before </html> at the end of the HTML page.
- 5-3, 5-4. Fetch and send back standard images on the page.
- 5-5. Browser requests the special image from Bandwidth Detection Server BDS (bds.site.com), due to the embedded special image.
- 5-6. BDS sends back a "302 Moved Temporarily" HTTP redirection reply, with a Location header of bds.site.com/n1.gif?id=ID, having a 5000 byte comment is included in the header. The BDS assignes an id, a timer is started (b1 is size of msg sent); start time and b1 are stored in hash, keyed by the id.
- 5-7. Browser re-directs request to new URL bds.site.com/n1.gif.
- 5-8. BDS stops timer, calculates dt1, sends back a "302 Moved Temporarily" HTTP redirection reply, with a Location header of bds.site.com/n2.gif?id=ID; having a 8000 byte comment in the header. The timer is started again (b2 is size of msg sent). The values dt1, b2, and new start time are stored in hash.
- 5-9. Browser re-directs request to new URL bds.site.com/n2.gif.
- 5-10. BDS stops timer, calculates dt2 and then bandwidth, sends back a "200 OK" HTTP reply, with a cookie storing the bandwidth and constant, with a 2 byte GIF image to close the session.

The technique of FIGS. 4 and 5 allows the user at the browser to receive a page without awaiting bandwidth detection, and executes the bandwidth detection during a time in which the user is likely reading the first image. Thus, there is less latency involved in initiating a web page access.

Figure 6:
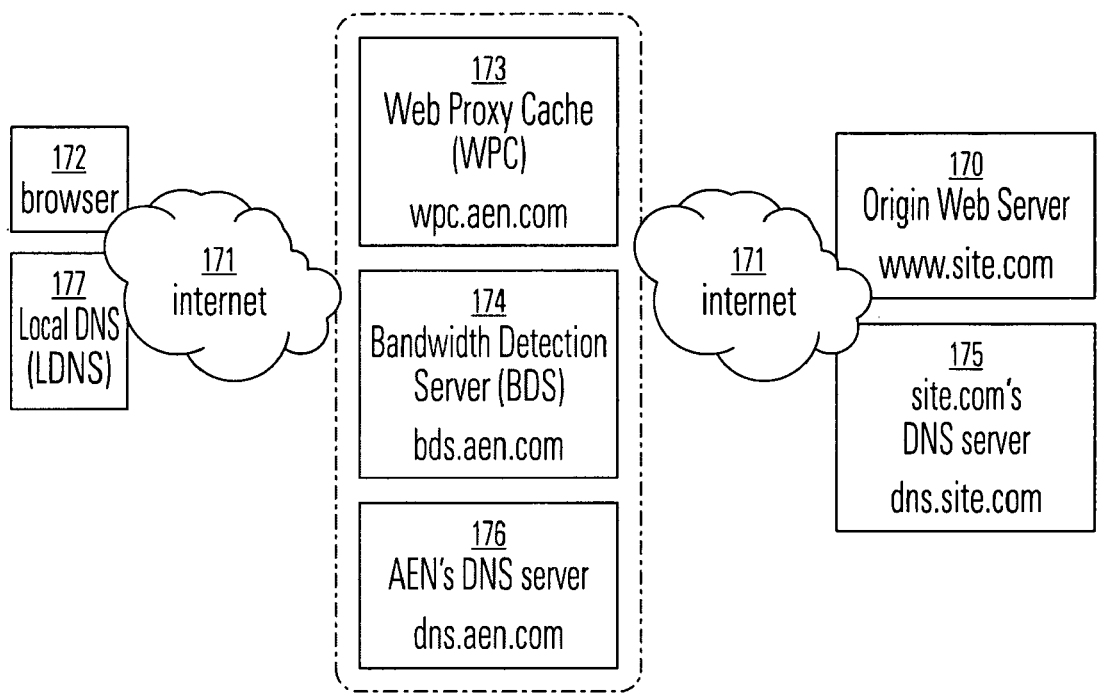
FIG. 6 is a simplified diagram of a network implementing a redirection technique for bandwidth detection, using a parallel and proxy mode.

FIG. 6 illustrates a simplified architecture including the originating web server 170 and a destination browser 172 coupled to the Internet 171, or other packet switched communication network. A web proxy server (including a cache) 173 and an associated bandwidth detection server 174 are interposed between the destination browser 172 and the web server 170. Domain name servers DNSs 175, 176 and 177 are associated with the web server 170, the proxy server 173 and the browser 172, respectively.

Figure 7:
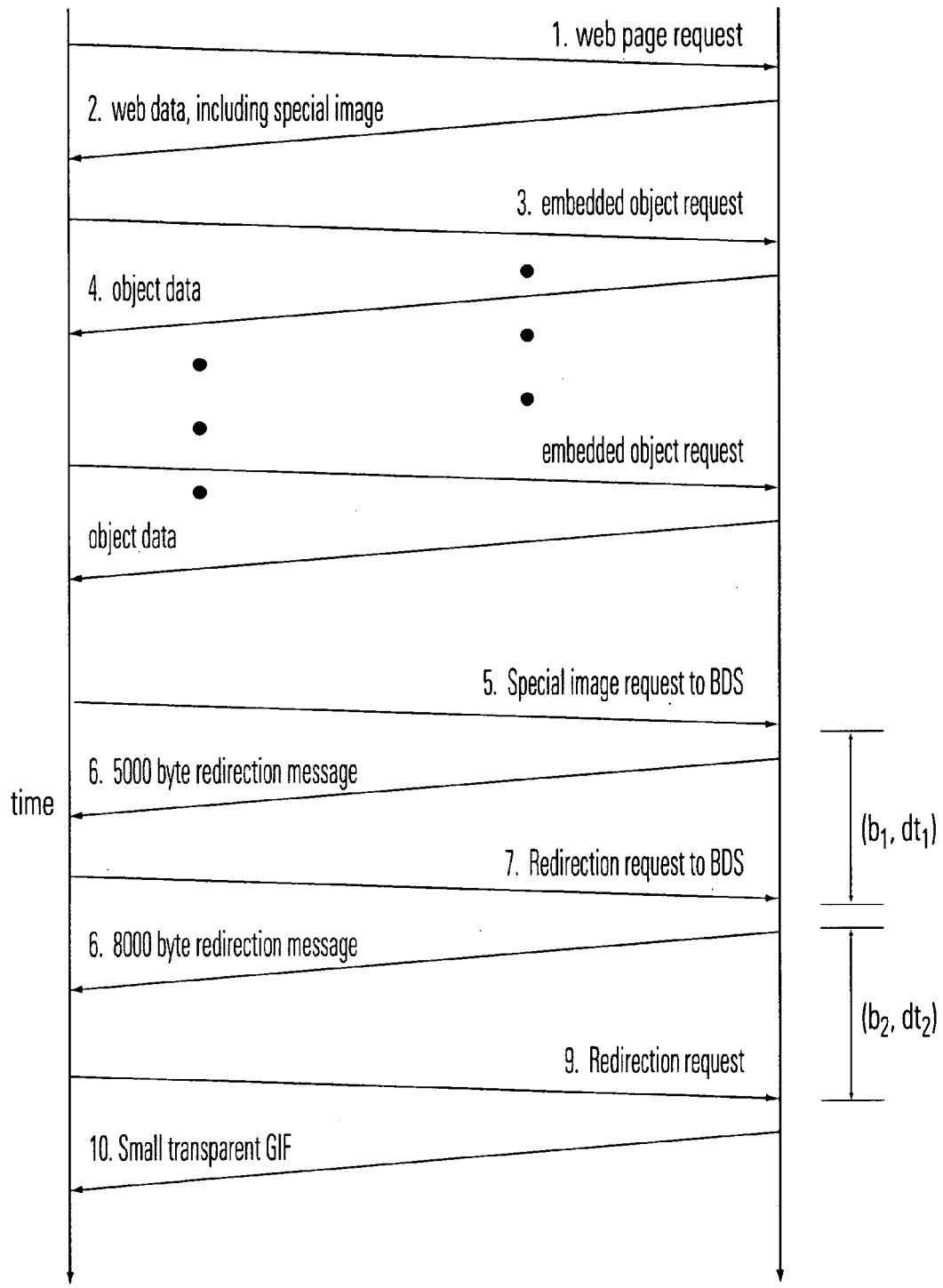
FIG. 7 illustrates communications between a client browser and the servers of the system in FIG. 6, for one embodiment.

FIG. 7 is a simplified diagram showing a communication time line among the destination browser 172, the proxy server 173, the web server 170, and the bandwidth detection server 174 in support of the bandwidth detection algorithm using redirection. In this example, the bandwidth detection server 174 resides at the location accessed in parallel with the proxy server 173, and is less intrusive of the operation of the originating web server 170.

The steps in FIG. 7 are numbered 7-1 through 7-10.

7-1. Browser 172 requests web page www.site.com/foo.html. This involves the browser's local DNS 177 contacting the DNS 175 at site.com. The DNS 175 at site.com returns a name server NS record with the name dns.aen.com of the DNS 176 at the WPC site. Dns.aen.com returns a record with the IP addres s of reverse proxy server WPC wpc.aen.com. The browser requests the web page from the WPC, sending along with the request, all of site.com's cookies.

7-2. The WPC 173 retrieves the page foo.html from www.site.com, adapts like in the parallel mode of FIG. 5 and embeds a special image at the end of the page retrieved from the origin web server. The URL for this special image refers to the Bandwidth Detection Server 174 (bds.site.com/n0.gif).

7-3. Browser requests embedded objects in the page (except the special image).

7-4. Requested objects transmitted back by the WPC 173.

7-5. Browser requests IP address of bds.site.com, and site.com's DNS 175 returns NS record of dns.aen.com. Access to dns.aen.com returns IP address of bds.aen.com. Browser 172 fetches special image from Bandwidth Detection Server 174, due to the embedded special image, sending all of site.com's cookies.

7-6. BDS 174 sends back a "302 Moved Temporarily" HTTP redirection reply, with a Location header of bds.site.com/n1.gif?id=ID; a 5000 byte comment is included in the header; an id is assigned, timer is started (b1 is size of msg sent); start time and b1 are stored in hash, key is id.

7-7. Browser re-directs request to new URL bds.site.com/n1.gif.

7-8. BDS stops timer, calculates dt1, sends back a "302 Moved Temporarily" HTTP redirection reply, with a Location header of bds.site.com/n2.gif?id=ID; a 8000 byte comment is included in the header; timer is started again (b2 is size of msg sent); dt, b2, and new start time are stored in hash 7-9. Browser re-directs request to new URL bds.site.com/n2.gif.

7-10. BDS stops timer, calculates dt2 and then bandwidth, sends back a "200 OK" HTTP reply, with a cookie storing the bandwidth and constant in site.com's domain, with a 2 byte GIF image.

Steps 7-6 through 7-10 of FIG. 7, and similar steps in FIGS. 3 and 5, are used for bandwidth measurement purposes. During step 7-6, 5000 bytes of header data is sent, and during step 7-7, the browser responds back with another connection. This time duration dt is stored along with the header size b1are computed in step 7-8. A similar measurement is done during steps 7-9 and 7-10, except the header size $b_2$ is 8000 bytes, resulting in measurement of time duration $dt_2$.

Based on these two data points, the bandwidth in bytes per second can be calculated after step 9 as shown in equation 1.

$$BW=(b_2-b_1)/(dt_2-dt_1) \qquad \text{Eq. 1}$$

A constant c is calculated as shown in equation 2. This constant c takes into account the time it takes to parse the header by the browser, the time to set up the TCP connection between the browser and the server, and a latency in transferring the data between the two machines.

$$c=dt_1-b_1/BW \qquad \text{Eq. 2}$$

If a higher order bandwidth measurement is required, such as as a function of the number of bytes transferred to account for effects such as the slow start mechanism of the TCP, more data points can be gathered and a higher order bandwidth equation can be utilized. The bandwidth detection server stores the bandwidth BW and a constant c calculated as a function of the destination browsers IP address, utilizing a cookie transferred during step 10. In one embodiment, the data is stored in a database, indexed by IP address. The format of the cookie in one preferred in embodiments is as follows:

$$IP<IP\text{address}>=<BW>/<c>/<num\text{Measurements}>$$

The parameter "numMeasurements" refers to the number of times measurements have been done for this destination.

During step 7-10, the bandwidth detection server also checks if the browser has returned a cookie having in the format shown above. If a cookie matches the client's current IP address, the previously stored bandwidth $BW_{prev}$, constant $c_{prev}$ and $numMeasurements_{prev}$ are used in calculating the new bandwidth and constant after step 9, based on the following algorithm (which results in the number of measurements times 2 new data points):

$b[0]=b1;$ $b[1]=b2;$ $t[0]=dt1;$ $t[1]=dt2;$

---

```
For (int i=0; i < numMeasurements_prev; i++)
{
    // number of bytes submitted
    b[i*2+2] = 500 * i;
    b[i*2+3] = 500 * i + 500;
    // time required to transmit this many bytes, assuming the previous
    // bandwidth measurement
    t[i*2+2] = 1/BW_prev * b[i*2+2] + c_prev;
    t[i*2+3] = 1/BW_prev * b[i*2+3] + c_prev;
}
numMeasurements = numMeasurements + 1;
```

---

Next, a standard curve fitting algorithm is employed to define an nth-order curve. A linear curve is used for simplicity in one preferred embodiment, and the newly calculated bandwidth and constant are stored in a cookie returned in step 10. The value numMeasurements is incremented by one in the cookie which is returned.

Figure 8:
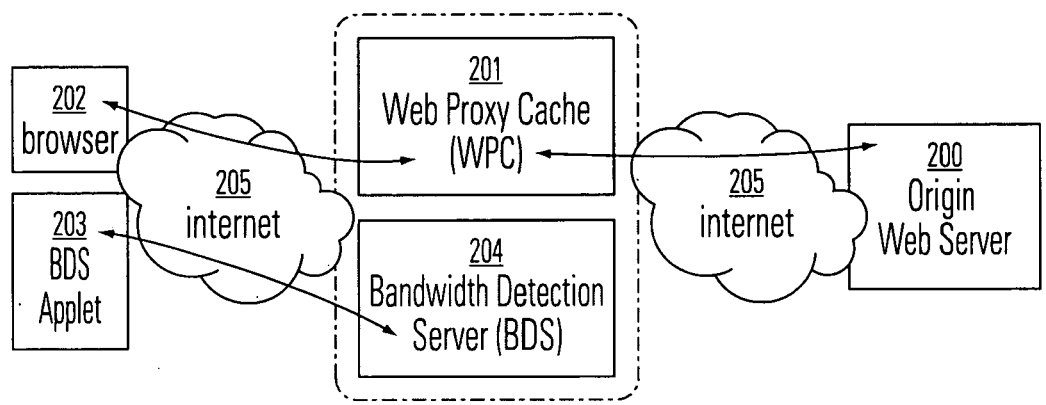
FIG. 8 is a simplified diagram of a heterogeneous network including a client having an applet for bandwidth detection.

FIG. 8 illustrates a simplified network architecture according to an alternative implementation, including the originating web server 200, a web proxy server (including a cache) 201, and a destination browser 202, for applet based bandwidth detection using a redirection technique or other technique. A bandwidth detection server 204 is associated with the proxy server 201. The originating web server 200 communicates via the Internet 205 with the web proxy server 201. The web proxy server 201 communicates via the Internet 205 with the browser 202. In this embodiment, the browser 202 includes an applet 203, or plug-in, which executes a bandwidth detection algorithm.

In one browser side approach, the browser applet 203 or plug-in (hereafter referred to as an applet) is downloaded from a web server to the client machine. The applet 203 then sends commands to the bandwidth detection server 204 to ask it to transmit a specific number of bytes. As the applet 203 receives a partial number of bytes, it records the number of bytes received and the time. At least two such data points must be recorded. When the transmission is complete, it can create a nth-order equation to capture the relation between number of bytes transmitted and the time required to receive it. A first order equation based on two data points would reveal the approximate round-trip latency time and the effective bandwidth.

For example, the client browser 202, under control of the applet 203, may request the transmission of 36,000 bytes from the server 204. The data transmitted must be random, to ensure that the data cannot be compressed by any of the underlying protocols. When the server 204 receives this command, it must send 36,000 bytes of random data. Because the data must traverse multiple network hops, the client browser 202 will receive this data in multiple chunks; the size and receive time of each chunk will most probably not be uniform. As the client browser 202 receives each chunk of data, it must measure the number of bytes received and the receive time. These data points can be then used to determine how long it will take to transmit an arbitrary number of bytes from the server to the client.

Figure 9:
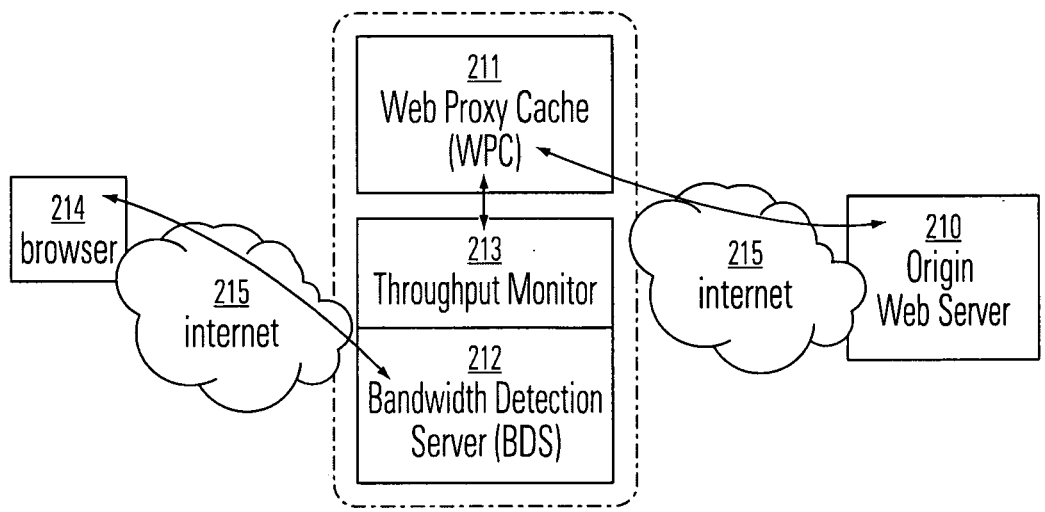
FIG. 9 is a simplified diagram of a heterogeneous network including an intermediate station for detection of bandwidth.

FIG. 9 illustrates a simplified network architecture according to an alternative implementation for server side bandwidth detection, including the originating web server 210, a web proxy server 211, and a destination browser 214. A bandwidth detection server 212 is associated with the proxy server 213, and measures and processes transmission times as discussed above to cancel effects on throughput other than the characteristics, such as size, of the packet being transmitted. The originating web server 210 communicates via the Internet 215 with the web proxy server 211. The web proxy server 211 communicates via the bandwidth detection server 212 as an intermediate station, and the Internet 215 with the browser 214. In this embodiment, the bandwidth detection server 212 executes a server-side bandwidth detection algorithm.

To use a server-side bandwidth detection approach, URLs for certain images are referred to the bandwidth detection server 212 instead of the regular image server 211. The bandwidth detection server 212 acts as a transparent proxy that fetches the image from the image server 211 and then transmits it to client 214.

Several operating systems, most notably Windows NT, utilize a blocking write ( ) I/O call.

Using a blocking write ( ) I/O call, the image is sent from the server 212 to the client 214. The duration of the blocking is measured; after measuring two such image writes, the bandwidth and latency can be calculated as in the client-side approach. More measurements can be utilized to create a higher order equation.

Another approach is to reduce the output buffer size of the write ( ) and send the image data in parts. Each write ( ) is invoked by writing an array whose size is greater than the output buffer size, guaranteeing a block until the data is retrieved by the client. By measuring multiple of these blocks of writes, the bandwidth and latency can be calculated from a single image transmission.

For operating systems like Unix variants that utilize a non-blocking write ( ) call, the TCP/IP stack must be modified to measure the timing of ACKs sent from the client after it received the data. This is the more accurate approach.

Because the TCP connection is initiated by the client machine to the server, firewalls, proxies other intermediate devices which might terminate the transmission layer connection pose no problem to this approach.

Web proxies/caches are typically implemented as transparent proxies; TCP data on port 80 is typically routed through a proxy via a Layer 4 (transmission layer) switch. To circumvent this route via a proxy, the URL for the images that are used for bandwidth measurement are not to the regular port 80, or 8080 or any other less common web ports, but rather a non-standard port such as 4654.

A variety of aspects of the invention are discussed below.

The TCP protocol uses a slow-start mechanism where it initially transmits data at a slower rate. By gathering more data points and calculating a higher order equation, this rate as a function of bytes transmitted can be calculated. This is valuable because a web page contains multiple embedded objects, not a single chunk of data. Therefore, by calculating rate as a function of bytes transmitted, a more accurate download time can be calculated.

A client machine may be mobile and therefore may utilize different IP addresses at different times (e.g. one when logged in at work, another when logged in from home, etc.). Instead of storing the bandwidth and latency only as a cookie on the client browser, we store the IP address as the key for the cookie, i.e., IP<IPaddress>=<bandwidth>/<latency>/<number>. Therefore, one client browser may have multiple cookies, each with a different IP address and each indicating a different level of available bandwidth between client and server.

The available bandwidth between the server and client fluctuates randomly over time. Therefore, periodically the bandwidth is re-measured between a server and client. The new measurements are integrated with old measurements to calculate a new set of data points. Each set of measurements is given equal weighting, because a drastic change in the calculated bandwidth or latency may be due to a one-time fluctuation in the available bandwidth. As explained above, a client cookie stores the calculated bandwidth; we also store a <number> with each cookie, indicating how many measurements were made. When the n+1st measurement is made, those data points are mixed with (n*k) other data points, where k is the order of the equation we want to calculate.

A typical client browser opens multiple connections to fetch multiple images in parallel. The number of parallel connections can vary, although it is typically four. Since each connection now has approximately 1/k the available bandwidth between the client and the server (where k is the number of parallel connections open during the measurement), the bandwidth detection measurements will be skewed. Since the number of open parallel connections isn't fixed nor measurable, simply multiplying the detected bandwidth by four does not work. Since all k connections are not opened simultaneously, it cannot be assumed that each connection receives 1/k of the available bandwidth; the available bandwidth can fluctuate due to many variables, including the server load, TCP protocol, client browser implementation, etc.

This problem is solved in one embodiment as follows. Most embedded images within a web page are located at the same server. Second, the image redirection or applet is placed as the last object within a web page. Therefore, it will be fetched in the last set of parallel connections. The solution is for the bandwidth detection server to wait on the request until all other images have been transmitted. When the bandwidth detection server receives a request, it sends a command to the main image servers, notifying them to issue a callback when they have finished transmitting data to a client with a specific ID (set as a client cookie). The bandwidth detection server waits for the callback before sending back the data. This typically guarantees that only one connection is open when the bandwidth detection server transmits data to the client.

This embodiment doesn't work for images whose URLs refer to servers that do not take callback requests from the bandwidth detection server. However, these URLs are typically for advertisement and are typically located at the top of the web page; therefore, all URL requests opened in parallel with the request to the web server are typically to the image server that grants callback requests from the bandwidth detection server.

In yet another approach, bandwidth information is stored in a database indexed by IP address, or other unique address information for clients. The database can be generated using the techniques described above, a combination of the techniques described above, or other methods. For an example of other methods, Internet Service Providers (ISP) generally use different IP address pools for different types of devices, e.g., dial-up analog modems, digital modems (ISDN), DSL, cable modem, T1, T3, etc. By storing the IP address pools and the associated device type, an approximate bandwidth can be determined when the client browser makes a request to the server. The data can be stored at the bandwidth detection server 101 of FIG. 1, or in other locations in the network, using well known network database techniques. In one embodiment, the database comprises cookies distributed to the destination devices.

In one embodiment, of the invention, a combination of bandwidth detection techniques is utilized to develop a value that is based on the results of different techniques, to cancel out irregularity of results in any one technique.

The present invention solves the problem of detecting the effective bandwidth between a web server and client/browser. The detection mechanism is:

is quick (in order of milliseconds or seconds).

enables concurrent bandwidth detection of many clients.

works even if there are web proxy/caches (i.e., any device that terminates the TCP connection from the client and opens a new connection to the server) between the client and the server.

works even if there are firewalls between the client and the server.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for determining bandwidth of a communication link in a packet switched network between a source to a destination, comprising:
   detecting a request for a user resource, and returning the user resource;
   in parallel with said returning the user resource, measuring transmission times to the destination for a plurality of data segments having different characteristics;
   processing the transmission times to cancel effects of transmission latencies other than the different characteristics of the data segments; and
   indicating a bandwidth based on said processing.

2. The method of claim 1 wherein said measuring includes:
   transmitting a first data segment to the destination via the packet switched network, the first data segment having a first size;
   transmitting a second data segment to the destination via the packet switched network, the second data segment having a second size;
   receiving a first contact from the destination when the first data segment is received and a second contact from the destination when the second data segment is received; and
   determining a first time interval between transmitting the first data segment and receiving the first contact and a second time interval between transmitting the second data segment and receiving the second contact.

3. The method of claim 2, wherein said processing includes:
   computing a value indicating bandwidth based on a difference between the first and second time intervals.

4. The method of claim 1, wherein the destination comprises an application executing a point-to-point communication protocol with the source of the user resource over the packet switched network.

5. The method of claim 1, wherein the destination comprises an application executing a protocol compliant with a standard hypertext transfer protocol HTTP.

6. The method of claim 1, wherein the destination comprises an internet browser.

7. The method of claim 1, wherein the source of the user resource comprises a server for resources identified by universal resource indicators URrs or universal resource locators URLS.

8. The method of claim 1, including storing an indication of the bandwidth on the destination.

9. The method of claim 1, including repeating said measuring and processing, and generating an updated indication of bandwidth based upon said repeated measuring and processing.

10. The method of claim 1, wherein said source of the user resource comprises a proxy server.

11. A method for determining bandwidth of a communication between a source to a destination in a packet switched network having a transmission layer protocol, comprising:
   opening a point-to-point connection in the packet switched network between a source of a user resource and the destination according to a communication protocol above the transmission layer protocol;
   detecting a request for the user resource, and returning at least a portion of the user resource;

after said returning at least a portion of the user resource, measuring transmission times within said communication protocol to the destination for a plurality of data segments having different sizes;

processing the transmission times to cancel effects of transmission latencies other than the size of the data segments; and indicating a bandwidth based on said processing.

12. The method of claim 11, wherein said communication protocol comprises a protocol compliant with a standard HTTP.

13. The method of claim 11, wherein said transmission layer protocol comprises a protocol compliant with a standard TCP.

14. The method of claim 11, wherein said source of the user resource comprises a proxy server.

15. The method of claim 1, wherein the destination comprises a device capable of executing a plurality of fetch operations in parallel, and said measuring includes transmitting the plurality of data segments when the destination is unlikely to be executing other fetch operations.

16. A method for determining bandwidth of a communication link between a source to a destination in a packet switched network having a transmission layer protocol, comprising:

opening a point-to-point connection in the packet switched network between the source and the destination according to a communication protocol above the transmission layer protocol;

measuring transmission times within said communication protocol between a source of a user resource and the destination for a plurality of data segments having different sizes, including at the source, detecting a request originating at the destination for the user resource;

at the source, appending a tag to the user resource and returning at least a portion of the user resource including the tag to the destination, the tag identifying a first measurement resource, and causing the destination to send a request for the first measurement resource in response to the tag;

at a server storing the first measurement resource, detecting the request for the first measurement resource, and returning the first measurement resource including a data segment having a first size with a tag identifying a second measurement resource and causing the destination to send a request for the second measurement resource;

at a server storing the second measurement resource, detecting the request for the second measurement resource, and returning the second measurement resource including a data segment having a second size; and determining a time interval between the returning of the first measurement resource and detecting a first contact indicating receipt by the destination of the first measurement resource; and at the server storing the second measurement resource, detecting a second contact from the destination indicating receipt of the second measurement resource, and determining a time interval between the returning of the second measurement resource and said detecting the second contact from the destination indicating receipt of the second measurement resource;

processing the transmission times to cancel effects of transmission latencies other than the sizes of the data segments; and indicating a bandwidth based on said processing.

17. The method of claim 16, wherein said source of the user resource comprises a proxy server.

18. The method of claim 16, including at the server storing the first measurement resource, returning the first measurement resource with a first priority, and as the server storing the second measurement resource, returning the second measurement resource with a priority higher than the first priority.

19. A method for determining bandwidth of a communication link in a packet switched network between a source to a destination, comprising:

detecting a request for a user resource, and returning the user resource using an intermediate device in the network which includes a cache for storing the user resource;

in a bandwidth detection engine associated with the intermediate device, measuring transmission times to the destination for a plurality of data segments having different characteristics;

processing the transmission times to cancel effects of transmission latencies other than the different characteristics of the data segments; and indicating a bandwidth based on said processing.

20. The method of claim 19, including performing said measuring, processing and indicating in parallel with said returning the user resource.

21. The method of claim 19, including performing said measuring, processing and indicating after returning a portion of the user resource.

22. The method of claim 19, wherein said intermediate device comprises a proxy server.

23. The method of claim 19, wherein said returning the user resource using the intermediate device includes:

directing the destination to the intermediate device in response to a request for the user resource;

storing the user resource in the cache; and transmitting the user resource to the destination from the cache.

24. The method of claim 23, including causing the destination to supply cookies associated with the source of the user resource to the intermediate device.

25. The method of claim 19, wherein said measuring includes:

transmitting a first data segment to the destination via the packet switched network, the first data segment having a first size;

transmitting a second data segment to the destination via the packet switched network, the second data segment having a second size;

receiving a first contact from the destination when the first data segment is received and a second contact from the destination when the second data segment is received; and determining a first time interval between transmitting the first data segment and receiving the first contact and a second time interval between transmitting the second data segment and receiving the second contact.

26. The method of claim 25, wherein said processing includes:

computing a value indicating bandwidth based on a difference between the first and second time intervals.

27. The method of claim 19, wherein the destination comprises an application executing a point-to-point communication protocol with the intermediate device over the packet switched network.

28. The method of claim 19, wherein the destination comprises an application executing a protocol compliant with a standard hypertext transfer protocol HTTP.

29. The method of claim 19, wherein the destination comprises an internet browser.

30. The method of claim 19, wherein the source of the user resource comprises a server for resources identified by universal resource indicators URIs or universal resource locators URLs.

31. The method of claim 19, including storing an indication of the bandwidth on the destination.

32. The method of claim 19, including repeating said measuring and said processing, and generating an updated indication of bandwidth based upon said repeated measuring and processing.

33. The method of claim 19, including maintaining a queue of requests for bandwidth measurement in the intermediate device.

34. The method of claim 33, including initiating said measuring by transmitting a first data segment in the plurality of data segments to the destination in response to a request in the queue at a first priority, and transmitting data segments after the first data segment in the plurality of data segments at a second priority higher than the first priority so that measurements in progress receive higher priority than measurements in the queue which are not yet begun.

35. A method for determining bandwidth of a communication link in a packet switched network between a source to a destination, comprising:

detecting a request for a user resource, and returning the user resource via an intermediate device in the network;

in a bandwidth detection engine associated with the intermediate device, detecting throughput of a plurality of data segments having different sizes to determine respective transmission times;

processing the transmission times to cancel effects of transmission latencies other than the different sizes of the data segments in the plurality of data segments; and indicating a bandwidth based on said processing.

36. The method of claim 35, wherein the intermediate device comprises a buffer with control logic blocking writes to the buffer pending retrieval of data in the buffer by the destination, and said detecting throughput comprises determining a duration of the blocking.

37. The method of claim 35, wherein the intermediate device establishes a transmission layer (layer 4) connection with the destination bypassing other intermediate stations in the network which terminate standard transmission layer links, and said detecting includes measuring timing of the transmission layer links to the destination.

38. The method of claim 37, wherein the transmission layer connection comprises a non-standard HTTP port.

39. A method of determining bandwidth of a communication link in a packet switched network between a source and a destination, comprising:

executing multiple steps of a program at the destination, including requesting a bandwidth measurement;

measuring transmission times to the destination for a plurality of data segments having different characteristics;

processing the transmission times to cancel effects of transmission latencies other than the different characteristics of the data segments; and indicating a bandwidth based on said processing.

40. The method of claim 39, wherein said measuring includes:

transmitting a first data segment to the destination via the packet switched network, the first data segment having a first size;

transmitting a second data segment to the destination via the packet switched network, the second data segment having a second size;

receiving a first contact from the destination when the first data segment is received and a second contact from the destination when the second data segment is received; and determining a first time interval between transmitting the first data segment and receiving the first contact and a second time interval between transmitting the second data segment and receiving the second contact.

41. The method of claim 40, wherein said processing includes:

computing a value indicating bandwidth based on a difference between the first and second time intervals.

42. The method of claim 39, wherein the destination comprises an application executing a point-to-point communication protocol with the source over the packet switched network.

43. The method of claim 39, wherein the destination comprises an application executing a protocol compliant with a standard hypertext transfer protocol HTTP, and said program comprises and applet.

44. The method of claim 39, wherein the destination comprises an internet browser, and said program comprises an applet.

45. The method of claim 39, wherein the source comprises a server for resources identified by universal resource indicators URIs or universal resource locators URLs.

46. The method of claim 39, including storing an indication of the bandwidth on the destination.

47. The method of claim 39, including repeating said measuring and said processing, and generating an updated indication of bandwidth based upon said repeated measuring and processing.

48. The method of claim 39, wherein said source comprises a proxy server.

49. The method of claim 39, including performing said measuring, said processing and said indicating in parallel with returning a user resource to the destination from the source.

50. The method of claim 39, including performing said measuring said processing and said indicating after returning a portion of a user resource to the destination from the source.

51. A method for determining bandwidth of a communication in a packet switched network between a source and a destination, comprising:

maintaining a database of bandwidth parameters indexed by destination addresses, accessing the database upon opening a communication channel between a source and a destination to obtain data indicating the bandwidth, and further including:

measuring transmission times to the destination for a plurality of data segments having different characteristics;

processing the transmission times to cancel effects of transmission latencies other than the different characteristics of the data segments; and indicating a bandwidth based on said processing and storing said bandwidth in said database.

52. The method of claim 51, wherein the destination address comprises an Internet Protocol address.

53. The method of claim 51, wherein the source comprises a server and a destination comprises a browser operating a protocol above the transmission layer.

54. The method of claim 51, wherein the communication channel comprises a session of a protocol compliant with a standard Hypertext Transfer protocol HTTP.

55. The method of claim 51, wherein said database comprises cookies distributed among destinations within the network.

56. The method of claim 51, wherein information in said database is provided by a third party.

57. The method of claim 51, including providing bandwidth parameters of said database using a plurality of techniques for measuring bandwidth.

* * * * *

UNITED STATES PATENT AND TRADEMARK OFFICE
CERTIFICATE OF CORRECTION

PATENT NO. : 6,992,983 B1  Page 1 of 1
APPLICATION NO. : 09/566186
DATED : January 31, 2006
INVENTOR(S) : Saurav Chatterjee It is certified that error appears in the above-identified patent and that said Letters Patent is hereby corrected as shown below:

Abstract,
Line 8, insert between "plurality" and "data" --of--;

Column 4,
Line 60, delete "6" and replace with --7--;

Column 7,
Line 21, delete "addres s" and replace with --address--;

Column 8,
Line 18, delete "as" before "as";

Column 10,
Line 16, insert --and-- after "proxies";

Column 12,
Line 48, delete "URrs" and replace with --URls--;
Line 49, delete "URLS" and replace with --URLs--;

Column 16,
Line 29, delete "and" before "applet" and replace with --an--.

Signed and Sealed this

Twenty-sixth Day of September, 2006

JON W. DUDAS
*Director of the United States Patent and Trademark Office*